United States Patent [19]

Willard et al.

[11] Patent Number: 4,898,528
[45] Date of Patent: Feb. 6, 1990

[54] DIVIDING AND ROUNDING MACHINE

[75] Inventors: Mark L. Willard, Saginaw; David E. Beatty, Wrenshall, both of Minn.; Jeffery A. Nyquist, Superior, Wis.

[73] Assignee: Dutchess Bakers' Machinery Company, Inc., Superior, Wis.

[21] Appl. No.: 217,657

[22] Filed: Jul. 12, 1988

[51] Int. Cl.⁴ ............................ A21C 3/10; A21C 5/08
[52] U.S. Cl. .................................... 425/185; 425/186; 425/189; 425/332; 425/297; 425/298
[58] Field of Search ............... 425/332, 292, 295, 297, 425/300, 181, 182, 183–186, 196, 192 R, 188, 189, 193, 296, 298, 318, DIG. 109, DIG. 248

[56] References Cited

U.S. PATENT DOCUMENTS

| | | | |
|---|---|---|---|
| 1,150,655 | 8/1915 | Bertram | 425/332 |
| 1,177,835 | 4/1916 | Van Houten | 425/300 |
| 1,352,424 | 9/1920 | Abrams et al. | 425/300 |
| 1,752,107 | 3/1930 | Plater | 425/196 |
| 1,764,586 | 6/1929 | Van Houten | 425/332 |
| 1,954,443 | 4/1934 | Doolin | 425/196 |
| 2,094,289 | 9/1937 | Blum et al. | 425/332 |
| 2,137,811 | 11/1938 | Royal | 425/298 |
| 2,158,594 | 5/1939 | Seem | 425/332 |
| 2,214,475 | 9/1940 | Napolillo | 425/182 |
| 3,521,578 | 7/1970 | Fraiolo, Sr. | 425/193 |
| 3,669,605 | 6/1972 | Reilly | 425/398 |
| 4,150,931 | 4/1979 | Gabrys | 425/192 R |
| 4,167,381 | 9/1979 | Hilmoe | 425/182 |

Primary Examiner—Jeffery Thurlow
Assistant Examiner—Mathieu Vargot
Attorney, Agent, or Firm—Paul L. Sjoquist

[57] ABSTRACT

A dough dividing and rounding machine for dividing and rounding dough wherein the machine includes a removable ring and dividing assembly for the convenient cleaning of the machine and to allow for the interchangeability of the dividing assembly with a second dividing assembly for the production of dough having different sizes, quantities or shapes. The present invention being particularly adapted for use in dividing and/or dividing and rounding machines wherein a predetermined quantity of pieces of equal sized dough are produced.

1 Claim, 4 Drawing Sheets

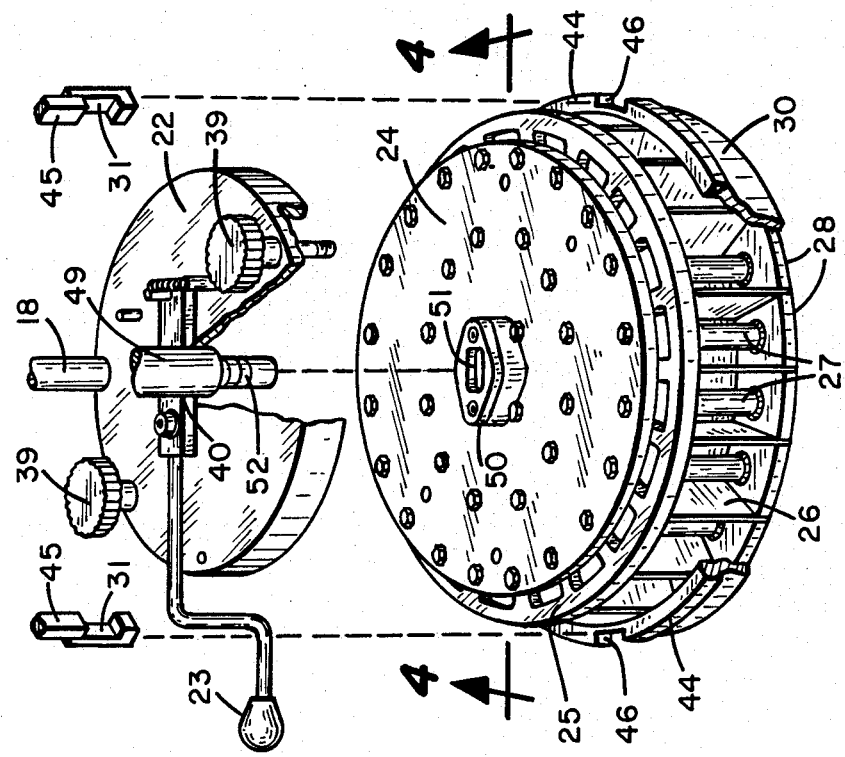
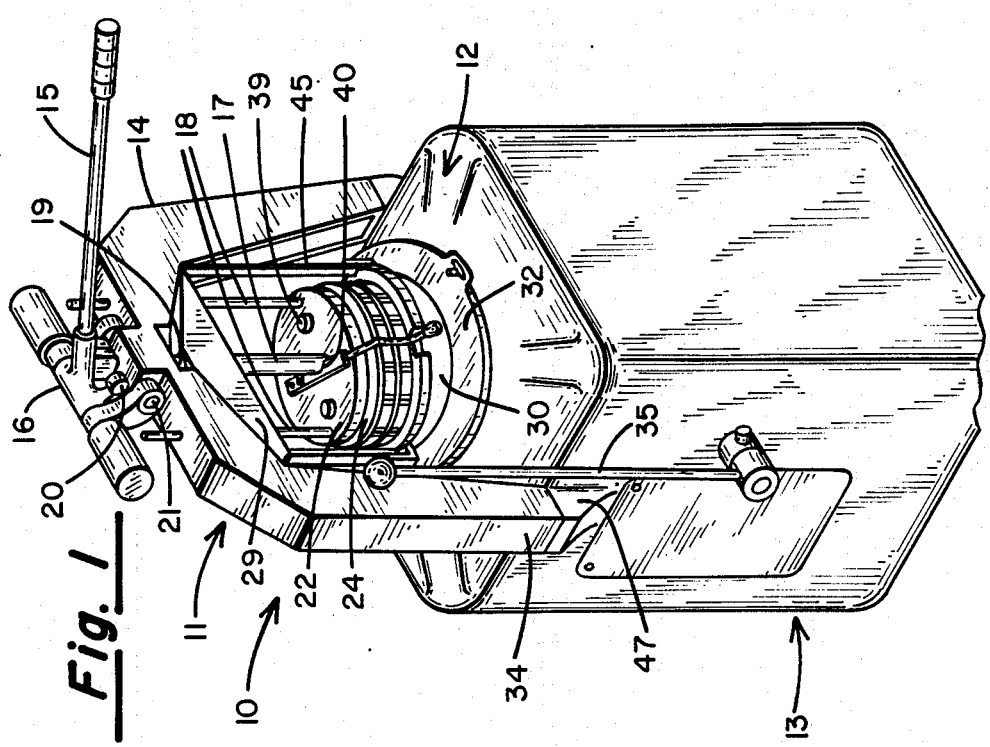

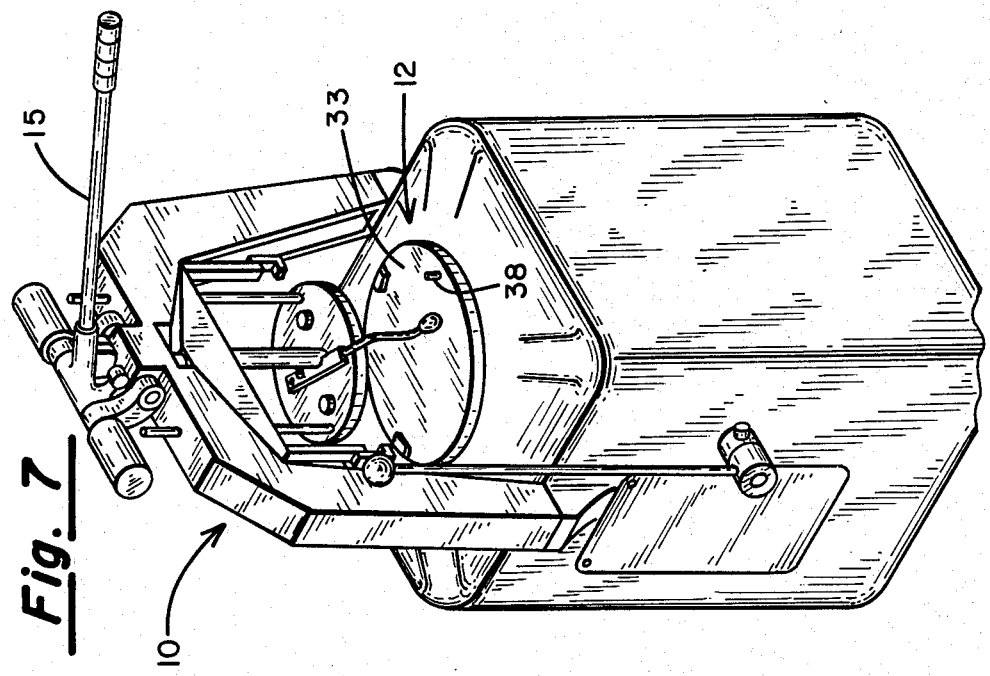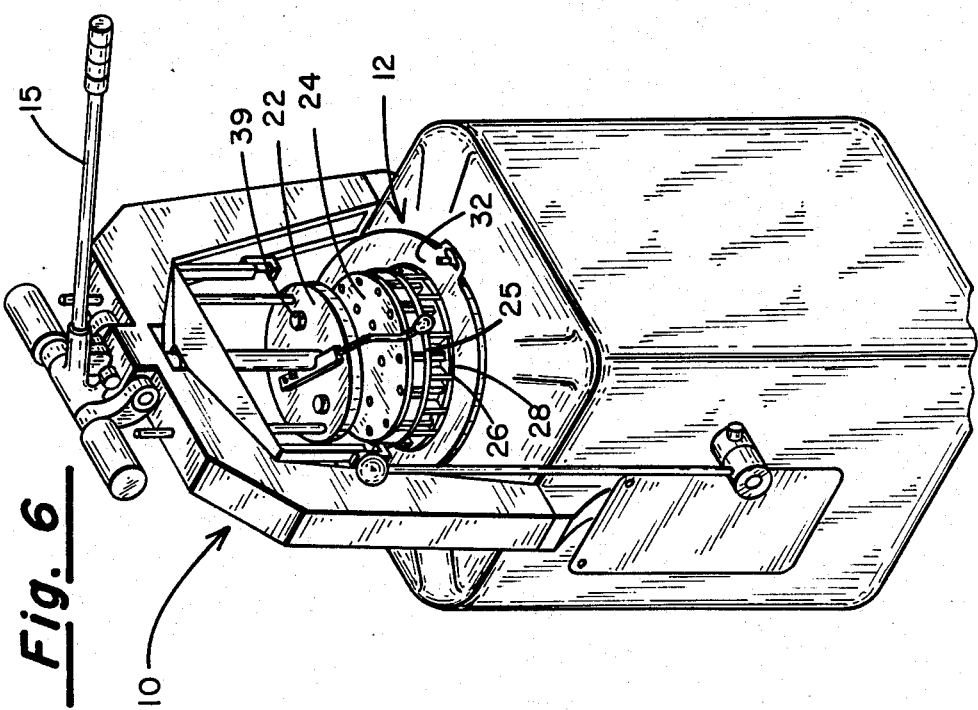

DIVIDING AND ROUNDING MACHINE

BACKGROUND OF THE INVENTION

The present invention relates generally to the art of handling materials such as bread dough, cookie dough, and other similar food products for human consumption but not limited to food products, for example, toys, pharmaceuticals, chemicals, plastics, and in other industries using materials of a consistency similar to dough and more particularly to a machine for dividing and/or rounding dough.

Dough dividing and rounding machines have been used in the baking industry for many years. Many of these machines were originally designed forty or fifty years ago and are commonly constructed of cast iron and weigh 600 pounds or more. Many of these devices are available today only because they were on the market prior to the present health and safety regulations. Examples of such devices are manufactured by Dutchess Bakers' Machinery Company, Inc. of Superior, Wis. and Seewer Rondo, Inc. of Hackensack, N.J.

These machines are very durable; however, their versatility and ability to be thoroughly cleaned leave much to be desired. A common problem with these prior machines is that the dividing assembly must be cleaned while it is mounted on the machine. Some of these machines allow the top section of the machine to be tilted for access to the dividing assembly, however, due to the weight of the top section of the machine, even this is not an easy task. Presently, most manufacturers recommend cleaning the dividing assembly using clean rags and an air hose. Unless the operator is very conscientious and thorough, it is not uncommon for dough residue to remain on the dividing assembly for long periods of time and thereby provide an environment which promotes the growth of harmful bacteria or insects. The alternative would be to dismantle the entire machine. This requires tools and mechanical skills not commonly found in most bakery shops.

Another important drawback with the presently available machines is that if the operator wishes to divide or round other sizes or quantities of dough beyond or below the limitations of the machine being used, another machine specifically designed for the dividing or rounding of the new size or quantity of dough must be purchased. For example, if the operator is presently making two ounce rolls with an eighteen part machine and wants to increase their production, a different machine must be purchased. Likewise, if the operator merely wants to decrease the size of the two ounce roll, a different machine must also be purchased to manufacture a roll smaller than the two ounce limitation of the eighteen part machine.

The present invention represents a major advance in the dough dividing and rounding industry. The present invention provides a dividing assembly which may be quickly and easily removed from the machine for cleaning or being interchanged with a different dividing assembly. Other dividing assemblies are also part of the present invention and will include multiple dividing assemblies to enable the operator to clean one dividing assembly without having to discontinue production. Additionally, the operator may change size quantity or type of product being processed within a few minutes by changing the dividing assembly to a new dividing assembly, pressing assembly or pattern impression assembly.

A limited number of patents have been found which may broadly relate to the present invention. One such patent is U.S. Pat. No. 1,954,443, issued to Doolin on Apr. 10, 1934. The Doolin patent discloses a dough dispensing and cutting device wherein the dough is fed through a pipe into a hollow machine head. The dough is then squirted from the machine head and cut into strips by a cutting ring. A feature of the Doolin patent is the use of a removable plate to allow for cleaning of the inner surface of the machine head.

U.S. Pat. No. 3,521,578, issued to Fraioli on July 21, 1968 discloses a conveyor operated rounding and molding machine. The Fraioli patent is directed to a rounding device wherein dough balls of various sizes and shapes may be made. The Fraioli device requires that a divider or other type of dispenser feed the dough into the channels prior to the rounding operation.

SUMMARY OF THE INVENTION

An advantage of the present invention is that it provides a readily removable dividing assembly for easy cleaning and maintenance of the dividing assembly without requiring special tools or skills to remove the dividing assembly from the machine.

Another advantage of the present invention is that the dividing assemblies are interchangeable to provide a dividing and rounding machine which is adaptable for dividing dough into a variety of shapes or sizes.

Another advantage of the present invention is that the dividing assembly may be used on dividing machines and on dividing and rounding machines The general operation of a dividing and rounding machine for dividing and rounding dough is described herein to provide an understanding of the overall invention. Although the operation of the present invention is discussed in the context of the operation of the dividing and rounding machine, it should be understood that a dividing machine operates in the same general manner and the discussion herein is applicable to both types of machines. Additionally, the operation of the present invention is described as it applies to the dividing and rounding of bread dough and it should be understood that the material to be divided and/or rounded may be nearly any material which has the general consistency of dough.

Initially, a piece of the dough to be divided, flattened, cut and/or shaped, is placed on a pallet and flattened to a circumference generally indicated by markings on the pallet. The pallet is then placed on the crank plate of the dividing and rounding machine. The present invention includes a single operating lever which, when lowered, rotates along a two point pivot linkage to lower the various parts of the dividing assembly. The initial movement of the operating lever causes the entire dividing assembly to move downwardly towards the pallet. Further movement of the operating lever causes a ring to contact the pallet and circumferentially enclose the dough. As the lever is lowered further, the false bottom of the dividing assembly contacts the dough and flattens the dough evenly on the pallet within the ring. Once the dough is evenly spread out on the pallet, a trip lever is sprung to release the knives from the dividing assembly. Further movement of the operating lever will then move the knives beyond the false bottom of the dividing head assembly to slice and divide the dough. Once the dough has been satisfactorily divided, the operator then begins the rounding process by moving the rounding lever to create eccentricity in the crank shaft and crank plate. The crank plate then eccentrically rotates to round the previously divided dough.

A feature of the present invention is the use of a slotted ring to allow for the removal of the ring from the ring yoke. The initial movement of the operating lever is transferred to the dividing assembly through the drive rack and a pair of glides. Further movement of the operation lever causes the ring to contact the pallet. Once the ring is lowered to contact the pallet, the ring is rotated to align a pair of grooves on the ring with the slotted arms on the ring yoke. The operating lever and dividing assembly are then returned to their original position and the ring is removed.

A further feature of the present invention is the use of a two piece drive rack to allow for the removal of the dividing assembly from the dividing and rounding machine. Once the ring is removed, the dividing assembly is once again lowered and a pair of turn knobs are unscrewed to allow the plug plate and knife plate to be separated from the trip plate. Once the turn knobs are removed, the plug plate and knife plate are held in place by the two piece drive rack. The plug plate and knife plate are then rotated to disengage the lower section of the drive rack from the upper section of the drive rack. Once this is completed, the operating lever and trip plate are returned to their original position and the plug plate and knife plate are removed from the dividing and rounding machine.

An object of the present invention is to provide a dividing and rounding machine which will easily allow the user to meet all government sanitation regulations and industry requirements.

A further object of the present invention is to provide a dividing and rounding machine wherein the entire dividing assembly may be easily removed for cleaning or maintenance.

A further object of the present invention is to provide a dividing and rounding machine wherein the entire dividing assembly may be readily interchanged with a second dividing assembly to allow the dough to be divided into different sizes and weights without purchasing an entirely new machine.

BRIEF DESCRIPTION OF THE DRAWINGS

FIG. 1 is a perspective view of a dividing and rounding machine constructed in accordance with the present invention;

FIG. 2 is a perspective view of the ring and dividing assembly of the present invention;

FIG. 6 is a perspective view of the present invention with the dividing assembly dismantled from the present invention.

FIG. 7 is perspective view of the present invention with the ring, dividing assembly and pallet removed.

DETAILED DESCRIPTION OF THE PREFERRED EMBODIMENT

Figure 3:
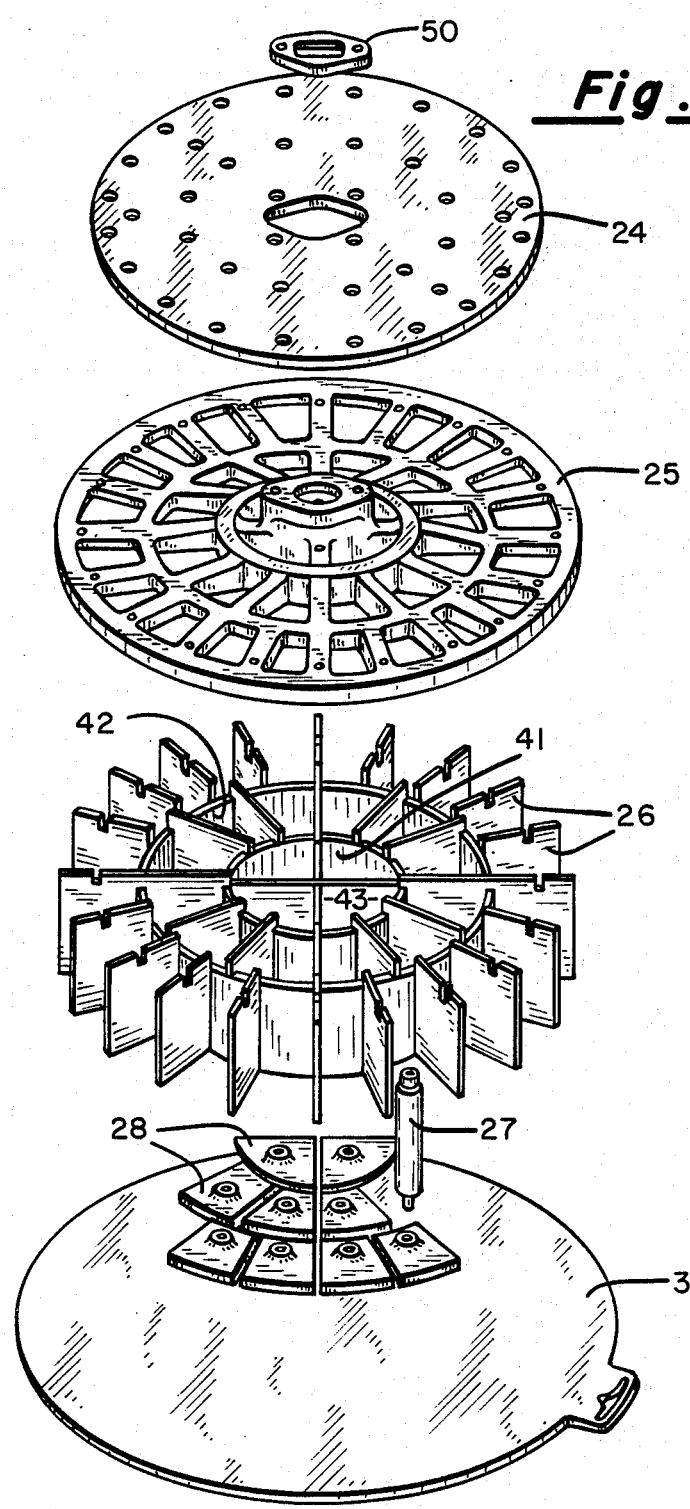
FIG. 3 is an exploded perspective view of the dividing assembly of the present invention.
Figure 5:
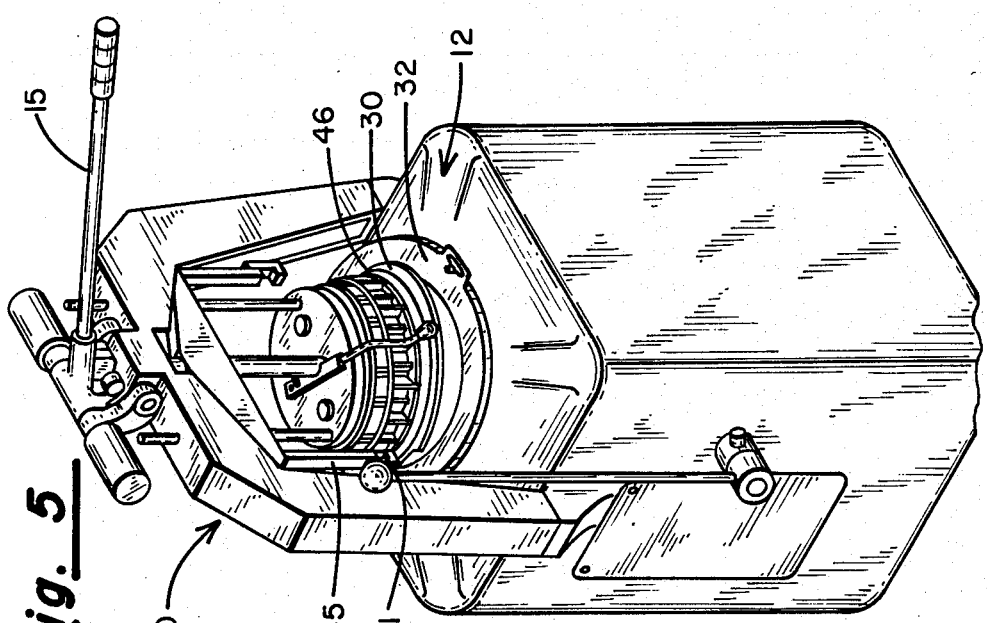
FIG. 5 is a perspective view of the present invention with the ring dismantled from the present invention.
Figure 4:
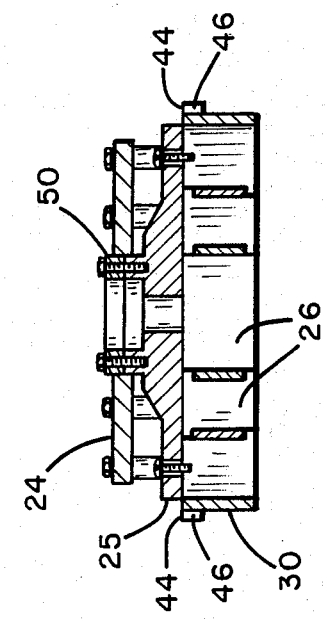
FIG. 4 is a cross-sectional view of the dividing assembly taken along lines 4—4 of FIG. 2.

The present invention is known in the baking industry or dividers trade as a dividing and rounding machine and is referred to herein generally as 10. The dividing and rounding machine 10 consists generally of an upper yoke section 11, a dividing and rounding section 12, and a base section 13. The upper yoke section 11 is preferably constructed of a sturdy metal and provides the leverage necessary for the operation of the dividing and rounding machine 10. The upper yoke section 11 includes as its primary components, an upper yoke 14, an operating lever 15, a pivot bracket 16, a drive rack 17, a pair of glides 18, and a ring pivot mechanism 19.

The operating lever 15 is essentially an elongate lever which provides leverage for the movement of the various components in the dividing and rounding section 12. The inner end of the operating lever 15 is mounted at the upper surface of the upper yoke 14 by means of the pivot bracket 16. The drive rack 17 is preferably of a two piece construction having an upper section 49 and a lower section 50. The upper section 49 is pivotally attached at its top end to the first pivot means 20 of the pivot bracket 16. The upper section 49 of the drive rack 17 extends downwardly through the upper yoke 14; the ring pivot mechanism 19 and the trip plate 22 to releasably engage the lower section 50 of the drive rack 17. The glides 18 extend downwardly through the upper yoke 14 and ring yoke 29 to engage the top surface of trip plate 22. The ring pivot mechanism 19 is attached at one end to the second pivot means 21 of the pivot bracket 16 and at its other end, the ring pivot mechanism 19 is rotatably attached to the ring yoke 29. Finally, the bottom arms 34 of the upper yoke 14 are directly attached to the frame 47 of the dividing and rounding machine 10 to support the components of the dividing and rounding section 12 above the base section 13.

The dividing and rounding section 12 is preferably constructed of aluminum and/or plastic components and includes a trip plate 22, a trip lever 23, a plug plate 24, a knife plate 25, knife blades 26, plug stems 27, plugs 28, pallet 32, and crank plate 33. The trip plate 22 includes a trip lever 23 and turn knobs 39. The glides 18 extend downwardly from the upper yoke 14 and attach directly to the top surface of trip plate 22. The trip lever 23 releasably engages the trip groove 40 on the upper section 49 of the drive rack 17. The plug plate 24 is located immediately below the trip plate 22 and is releasably attached to the trip plate 22 by the turn knobs 39.

Presently, the plug plate 24 and knife plate 25 include a large number of individual plugs 28 and knife blades 26, respectively, which are attached to the lower surface of each plate. It is readily anticipated that the plug plate 24 and/or the knife plate 25 may be made of a single piece construction to eliminate the need for the large number of individual pieces which are presently manually attached to each plate. Additionally, the removability of the plug plate 24 and knife plate 25 allow the operator to create specialty pieces for holidays or other special occasions by using a plug plate 24 and knife plate 25 combination configured to create designs such as hearts, snowmen or Christmas trees. Once production of the specialty pieces is completed, the desired plug plate 24 and knife plate 25 combination may be reinstalled in the dividing and rounding machine 10.

The plug stems 27 extend downwardly from the plug plate 24 and pass through openings in the knife plate 25 to hold the knife plate 25 releasably aligned with the plug plate 24. The plug stems 27 hold the plugs 28 a fixed distance from the plug plate 24 and in alignment with the knife plate 25 so that the knife blades 26 fit between the respective plugs 28. The knife blades 26 extend downwardly from the knife plate 25 in a fixed pattern to create openings between the respective knife blades 26 having the same identical volume. The knife blades 26 are held in place by an inner ring 41, an outer ring 42 and cross members 43. The knife blades 26, inner ring 41, outer ring 42 and cross members 43 fit between the spaced apart plugs 28 to form a generally flat false bottom surface during the initial operation of the dividing and rounding machine 10. Once the trip lever 23 is released from the trip groove 40, the knife blades 26 extend downwardly past the spaced apart plugs 28 to divide the dough.

The ring yoke 29 is a generally U-shaped structure which extends downwardly from the ring pivot mechanism 19 to surround the dividing and rounding section 12. The arms 45 of the ring yoke 29 are generally adjacent to the outer surface of the trip plate 22 and plug plate 24. The arms 45 include a pair of ring grooves 31 near their lower surface to retain the ring 30 during the dividing and rounding procedure. Ring 30 includes an outer rim 44 and a pair of ring slots 46 along its top, outer surface. Ring 30 is positioned so as to generally encircle the plug plate 24 and knife plate 25.

Finally, the base section 13 of the dividing and rounding machine 10 consists generally of a frame 47, a rounding lever 35, a motor (not shown), and a variable crank shaft (not shown). The rounding lever 35 is attached to one side frame 47 and operates to engage the motor with variable crank shaft to eccentrically rotate the crank plate 33.

In operation, the dough is placed on the pallet 32 and the pallet 32 is then placed on crank plate 33 by aligning the bottom surface of pallet 32 with the pallet extension 38. The operator then pulls down on operating lever 15 to rotate pivot bracket 16 which moves the first pivot means 20 and pushes downwardly on the drive rack 17. As the drive rack 17 is pushed downwardly, the entire dividing and rounding section 12 moves downwardly to a position a few inches above the dough on the pallet 32. Further downward movement of operating lever 15 rotates the second pivot means 21 which in turn lowers ring yoke 29 and ring 30. As the second pivot means 21 is moved downwardly, the ring 30 contacts pallet 32 to form an outer circumferential border for the dough. Further downward movement of the operating lever 15 lowers a dividing and rounding section 12 of the dividing and rounding machine 10 until the dough is evenly flattened This is accomplished by pressing the false bottom surface created by the knife blades 26 and plugs 28 against the pallet 32 and the inner surface of the ring 30. Once the dough has been flattened, lever 23 is released from the trip groove 40 to disengage the drive rack 17 from the trip plate 22. Once the drive rack 17 is disengaged, further downward pressure on the operating lever 15 pushes the knife plate 25 and knife blades 26 downwardly beyond the lower surface of the plugs 28 to divide the dough into equally sizes pieces.

After the dough is divided, the operator begins the rounding process by pulling the rounding lever 35 forward. The rounding lever 35 then causes the motor to engage the variable crank shaft. The variable crank shaft and motor operate to eccentrically rotate the crank plate 33. Rotation of the crank plate 33 also causes the pallet 32 to eccentrically rotate while the dough remains within the various openings created by the knife blades 26. Continued rotation of the dough and pallet 32 causes the dough to form dough balls of equal size and shape which may then be baked and used as rolls or buns.

The design of the present invention allows for the removal and cleaning of all of the components of the dividing and rounding machine 10 which contact the dough. The following step by step procedure is described to illustrate the ease with which the present invention may be cleaned or adapted for the production of dough balls having a different weight, quantity or shape.

Typically, the ring 30 is removed first. This is accomplished by pulling down on the operating lever 15 until the ring 30 contacts the pallet 32. The operating lever 15 is then raised slightly so that the ring 30 may be rotated until the ring slots 46 are aligned with the ring grooves 31 on the arms 45 of the ring yoke 29. Next, the operating lever 15 is raised and the ring 30 is removed from the pallet 32.

The next step in removing the elements of the dividing and rounding machine 10, is to remove the plug plate 24 and knife plate 25 from the dividing and rounding section 12. This is accomplished by pulling down on the operating lever 15 until the false bottom surface of the plugs 28 and knife blades 26 contact the pallet 32. The turn knobs 39 on the trip plate 22 are then turned to release the plug plate 24 from the trip plate 22. Next, the plug plate 24 and knife plate 25 are rotated to release the locking groove 51 on the lower section 50 of the drive rack 17 from the cross key 52 on the upper section 49 of the drive rack 17. Finally, the operating lever 15 is raised to lift the trip plate 22 away from the plug plate 24 and knife plate 25. The plug plate 24 and knife plate 25 are then removed from the dividing and rounding machine 10.

The last component to be removed from the dividing and rounding machine 10 is the pallet 32. The pallet 32 is removed from the dividing and rounding section 12 by merely lifting the pallet 32 off the pallet extension 38.

It is anticipated that that present invention is readily adaptable to machines that perform only the dividing function of the present invention and that various modifications may be made to the present invention by those skilled in the art without avoiding the scope of the present invention as defined by the claims attached hereto.

That which is claimed:

1. In a machine for dividing material such as dough or the like wherein the dough or the like is placed on a pallet supported by a crank plate which is movably mounted on a machine frame, and the machine frame includes an upstanding yoke section with an overhead support spaced above the crank plate, and a vertically movable rack connected to the overhead support, the rack having a lower yoke section attached thereto with said lower yoke section having downwardly extending arms, and a dividing assembly removably connected to said rack and downwardly extending arms, the improvement in rack, downwardly extending arms and dividing assembly comprising:

(a) said rack having a lower end formed into a cross key;

(b) said downwardly extending arms each having a ring groove proximate a lower end;

(c) said dividing assembly having an upper plate with a locking groove complementary sized to accept said cross key in one position and to engage and lock said cross key in another position of said dividing assembly;

(d) said dividing assembly further comprising an outer ring, said outer ring having a pair of ring slots which are alignable with said downwardly extending arms ring grooves, whereby said ring may be engaged and removed from said downwardly extending arms by aligning said ring slots and said ring grooves, and said ring may be attached to said downwardly extending arms by rotating said ring relative to said arms; and (e) a trip plate attached to said lower yoke section above said dividing assembly, said trip plate having means for removably fastening to said dividing assembly, and having a pivotable lever engageable to said rack, said rack having a trip groove sized to receive said lever.

* * * * *